United States Patent [19]

Flammer

[11] Patent Number: 5,776,519
[45] Date of Patent: Jul. 7, 1998

[54] PARISON EXTRUSION HEAD WITH QUICK CHANGE DIE RING CLAMP ASSEMBLY

[75] Inventor: Charles D. Flammer, Flanders, N.J.

[73] Assignee: Graham Engineering Corporation, York, Pa.

[21] Appl. No.: 870,835

[22] Filed: Jun. 6, 1997

[51] Int. Cl.[6] .......................... B29C 47/20; B29C 47/22
[52] U.S. Cl. .................. 425/188; 425/192 R; 425/381; 425/466; 425/532
[58] Field of Search ................. 425/188, 192 R, 425/381, 532, 466

[56] References Cited

U.S. PATENT DOCUMENTS

| | | | |
|---|---|---|---|
| 2,940,120 | 6/1960 | Grebowiec | 425/532 |
| 3,690,798 | 9/1972 | Brukovsky et al. | 425/381 |
| 4,165,212 | 8/1979 | Ziegler | 425/532 |
| 4,365,949 | 12/1982 | Nash | 425/463 |
| 4,394,116 | 7/1983 | Kuenzig et al. | 425/192 R |
| 4,492,548 | 1/1985 | Hubert | 425/113 |
| 4,495,022 | 1/1985 | Viriyayuthakorn et al. | 156/500 |
| 4,507,071 | 3/1985 | Hahn et al. | 425/133.1 |
| 4,512,943 | 4/1985 | Hahn et al. | 264/173 |
| 4,518,343 | 5/1985 | Seiffert | 425/466 |
| 4,545,751 | 10/1985 | Lupke | 425/72 R |
| 4,712,993 | 12/1987 | Lupke | 425/466 |
| 4,756,682 | 7/1988 | Blaise | 425/113 |
| 4,826,422 | 5/1989 | Hunter | 425/461 |
| 4,834,635 | 5/1989 | Groen | 425/72.1 |
| 4,909,720 | 3/1990 | Lomberg | 425/190 |
| 5,004,578 | 4/1991 | Eiselen | 264/514 |
| 5,057,267 | 10/1991 | Seizert et al. | 264/541 |
| 5,062,782 | 11/1991 | Tompkins et al. | 425/113 |
| 5,069,850 | 12/1991 | Tompkins et al. | 264/167 |
| 5,102,602 | 4/1992 | Ziegler | 264/209.2 |
| 5,108,682 | 4/1992 | Tompkins et al. | 264/167 |
| 5,108,683 | 4/1992 | Anand | 425/133.1 |
| 5,120,212 | 6/1992 | Reiber et al. | 425/141 |
| 5,128,084 | 7/1992 | Tompkins et al. | 264/167 |
| 5,186,957 | 2/1993 | Magnollay et al. | 425/188 |
| 5,215,698 | 6/1993 | Altimus | 425/192 R |
| 5,256,051 | 10/1993 | Langos et al. | 425/133.1 |
| 5,292,472 | 3/1994 | Tompkins | 425/462 |
| 5,388,977 | 2/1995 | Shirakawa | 425/192 R |
| 5,468,137 | 11/1995 | Becktel et al. | 425/381 |
| 5,496,164 | 3/1996 | Czarnik | 425/72.1 |
| 5,565,218 | 10/1996 | Brown et al. | 425/113 |
| 5,576,032 | 11/1996 | Lupke | 425/186 |
| 5,620,714 | 4/1997 | Veen | 425/192 R |

FOREIGN PATENT DOCUMENTS

| | | | |
|---|---|---|---|
| 39-22363 | 10/1964 | Japan | 425/532 |
| 52-13221 | 4/1977 | Japan | 425/188 |

*Primary Examiner*—Robert Davis
*Attorney, Agent, or Firm*—Thomas Hooker, P.C.

[57] ABSTRACT

A parison extrusion head includes a cylindrical body, a programing rod in the body, a die pin on the end of the rod, and a die ring mounted on the end of the body by a clamp assembly having a pair of clamp arms which are connected to the body by hinges and are rotated between a closed position holding the die ring on the body an open position permitting free removal of the die ring. The clamp arms carry bolts used to move the die ring laterally and adjust the thickness of the extruded parison.

14 Claims, 3 Drawing Sheets

PARISON EXTRUSION HEAD WITH QUICK CHANGE DIE RING CLAMP ASSEMBLY

FIELD OF THE INVENTION

The invention relates to parison extrusion heads, particularly accumulator-type extrusions heads, where the diameter of the parison may be varied by changing the die ring and pin on the extrusion end of the head.

DESCRIPTION OF THE PRIOR ART

During blow molding, molten thermoplastic resin is flowed through an extrusion head to form a tubular parison. The parison flows out of the head between a circumferential die ring mounted on the end of the head and a die pin mounted on the end of a programing rod or mandrel located inside the head. The diameter of the parison is determined by the ring and pin.

A single extrusion head may be used to extrude different diameter parisons, particularly when the parisons are used for blow molding of relatively large containers are extruded by accumulator-type extrusion heads. Different diameter parisons are required in order to blow mold different size containers.

Conventionally, die rings are held in place on the extrusion end of a head inside a mounting ring which is secured to the head by a large number of circumferentially spaced bolts. The lateral position of the die ring with regard to the axis of the head is adjusted by means of adjustment bolts which extend through the mounting ring and engage the die ring. The pin is threadably mounted on the programing rod or mandrel.

In order to changeover an extrusion head from a set-up extruding a first diameter parison to a set-up extruding a different diameter parison, it is necessary to remove the die ring and pin, mount a new die ring and pin on the head and then adjust the new die ring to assure that the parison has a desired circumferential thickness. Changeover must be performed as rapidly as possible to minimize down time for the entire blow molding machine. Changeover is difficult and time consuming. Extrusion heads, particularly accumulator-type extrusion heads, are relatively large and, in production, are heated to a high operating temperature required to flow molten thermoplastic resin. The operation temperature may be as high as 300° F. to 450° F. (148.9° C.-223.4° C.)

The old die pin is relatively easily removed by inserting a tool in an opening in the exposed face of the pin and unthreading the pin from the end of the rod or mandrel. However, removal of the old die ring is difficult and time consuming because of the large number of hot bolts which must be removed and the relatively large size and weight of the mounting ring and the die ring. Likewise, mounting of the new die rings on the end of the head is time consuming and difficult because of the size and weight of the new ring parts and the large number of bolts which must be attached. The changeover time for a relatively large diameter accumulator-type die ring and pin may take two hours, during which time the entire blow molding machine is out of production.

The described conventional bolt-on die rings permits lateral adjustment of the die ring with respect to the die pin or mandrel to assure the parison has a desired thickness. In some extrusion heads, the die ring is held in place on the discharge end of the head using a circumferential clamp ring with V-shaped clamp surfaces that engage axially facing tapered surfaces on the head and ring so that tightening of the clamp holds the die ring in place on the head. This arrangement does not permit lateral adjustment of the ring to control the thickness of the extruded parison.

Conventional extrusion heads are provided with a floating insert ring which is closely fitted against the inside of the head body and is loosely held in place on the head body by bolts. The insert ring rests flush against the die ring and forms a seal that prevents outward flow of molten resin.

SUMMARY OF THE INVENTION

The invention is an improved parison extrusion head with a die ring clamp assembly which permits rapid die ring and pin changeover. The assembly holds the die ring on a floating insert ring at the end of the head using a pair of arcuate clamp arms which surround the die ring and hold the ring in place while permitting lateral adjustment of the ring. The clamp arms carry adjustment bolts which are used to adjust the die ring laterally to assure proper parison thickness.

The clamp assembly permits rapid removal of the original die ring and mounting of a new die ring during changeover of the extrusion tooling, to reduce down time. Changeover time for the die pin and ring may be as little as one-half hour, including the time required to adjust the die ring laterally on the end of the head.

Other objects and features of the invention will become apparent as the description proceeds, especially when taken in conjunction with the accompanying drawings illustrating the invention, of which there are three sheets and one embodiment.

DESCRIPTION OF THE PREFERRED EMBODIMENT

Figure 1:
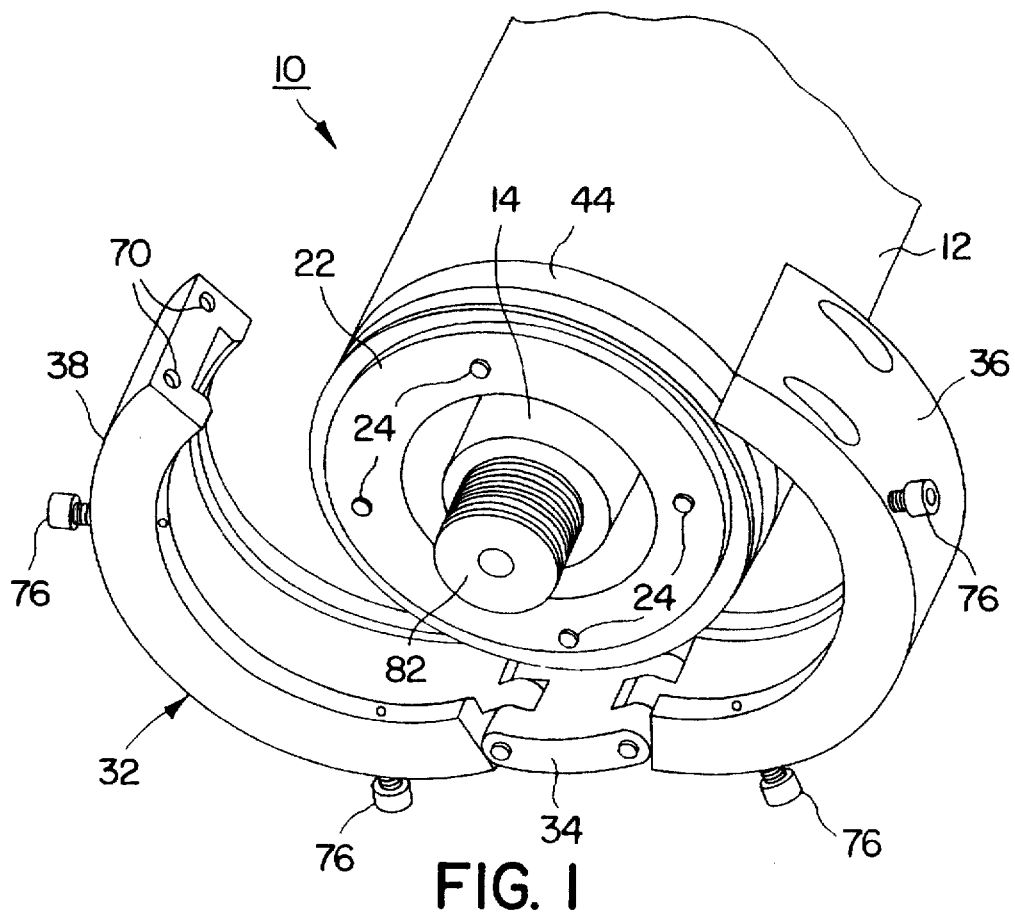
FIG. 1 is a perspective view of the discharge end of a parison extrusion head with the clamp assembly open and the die pin and die ring removed.

FIG. 1 illustrates the discharge end of parison extrusion head 10. The head 10 is conventional in design and includes a cylindrical head body 12 with programming rod 14 located in the center of the body to define an annular flow passage 16 between the body and rod. Molten thermoplastic resin is flowed along passage 16 past die ring 18 mounted on the lower end of body 10 and die pin 20 mounted on the lower end of rod 14 to form a tubular parison of the type used in blow molding plastic containers. Head 10 may be of the accumulator type which receives and stores a volume of resin flowed from an extruder and then extrudes the stored resin at one time to form a large volume parison for blow molding large plastic containers. Typically, an extrusion-type head includes a programming rod drive which axially shifts rod 14 from a closed position downwardly to an open position during extrusion. After extrusion, the drive raises the rod to close the extrusion opening between the die pin and die ring during accumulation of the next volume of resin to be extruded.

Parison extrusion head 10 may also continuously extrude a thermoplastic parison of the type used in blow molding containers smaller than the containers blow molded using accumulator heads.

Figure 3:
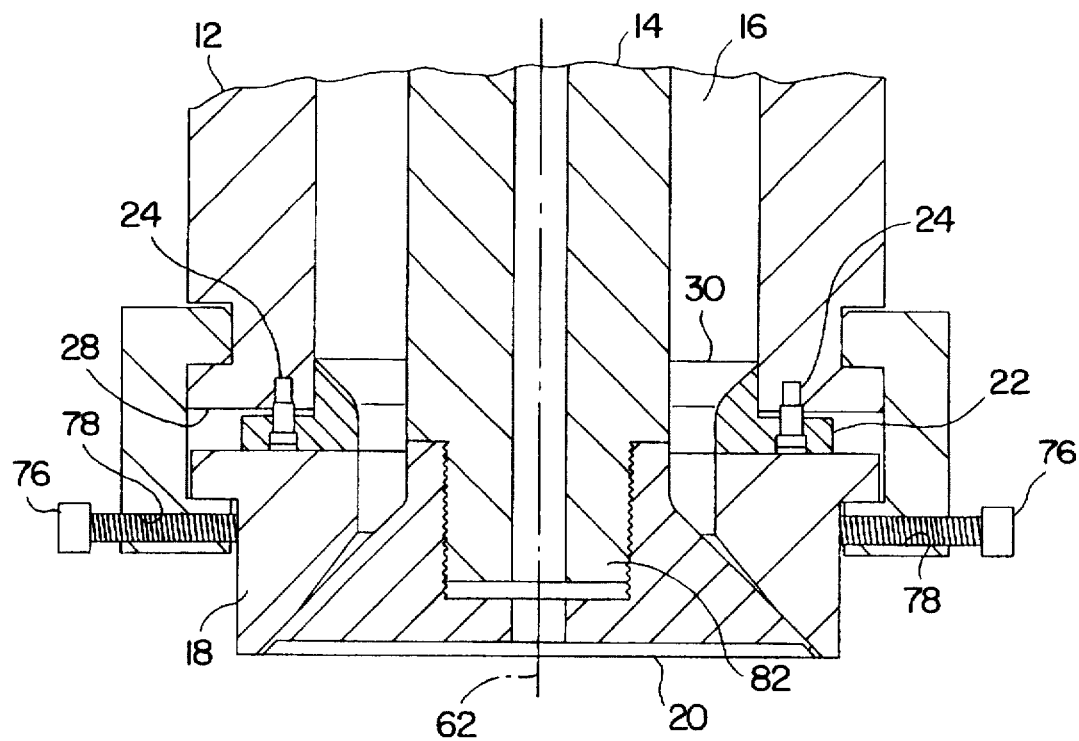
FIGS. 3 and 4 are vertical sectional views taken along lines 3—3 and 4—4 of FIG. 2, respectively.
Figure 4:
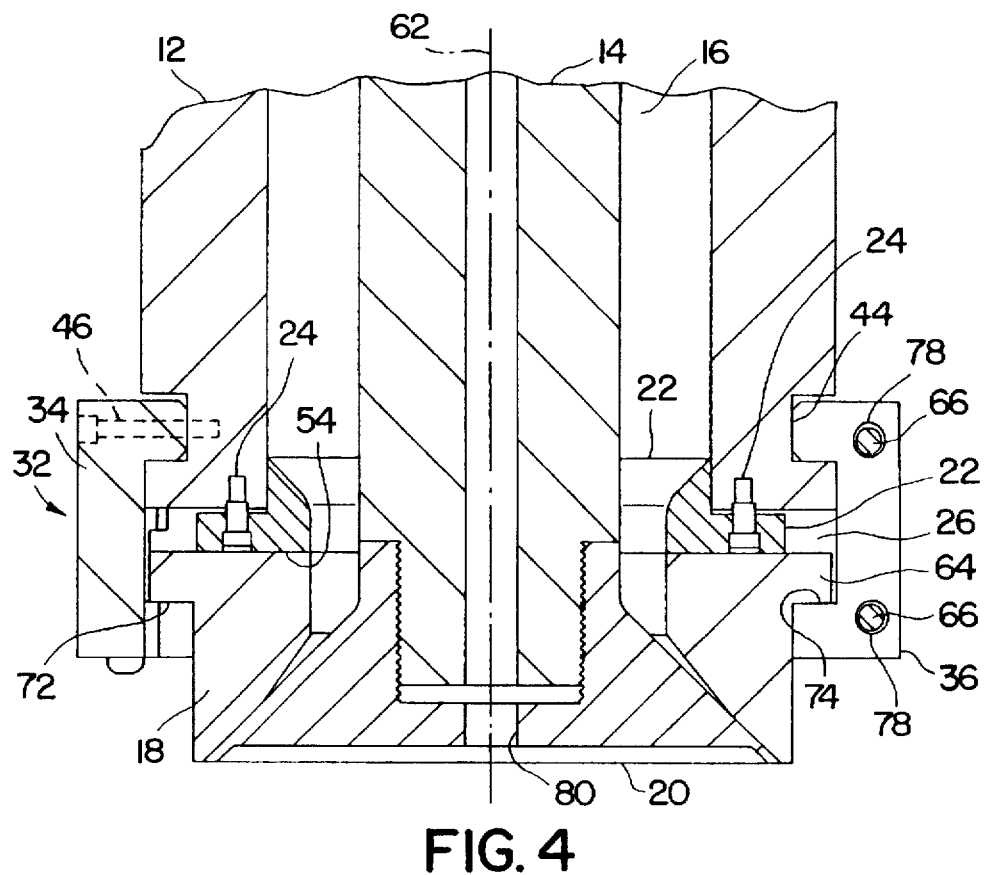

Floating insert ring 22 is mounted on the lower end of head body 12 by four bolts 24 which extend through the ring and into the head while permitting limited axial movement of the ring. In FIGS. 3 and 4, ring 22 is shown resting on the flat upper surface 26 of die ring 18 and spaced a slight distance below the end surface 28 of head 10. A circumferential sealing collar 30 extends upwardly from the inner edge of ring 22 and has a close sliding fit with the interior surface of head body 12. The fit between the sealing collar and head body prevents leakage of thermoplastic resin through the interface between collar 30 and body 12 while permitting limited axial movement or float of ring 22 relative to the body.

Figure 5:
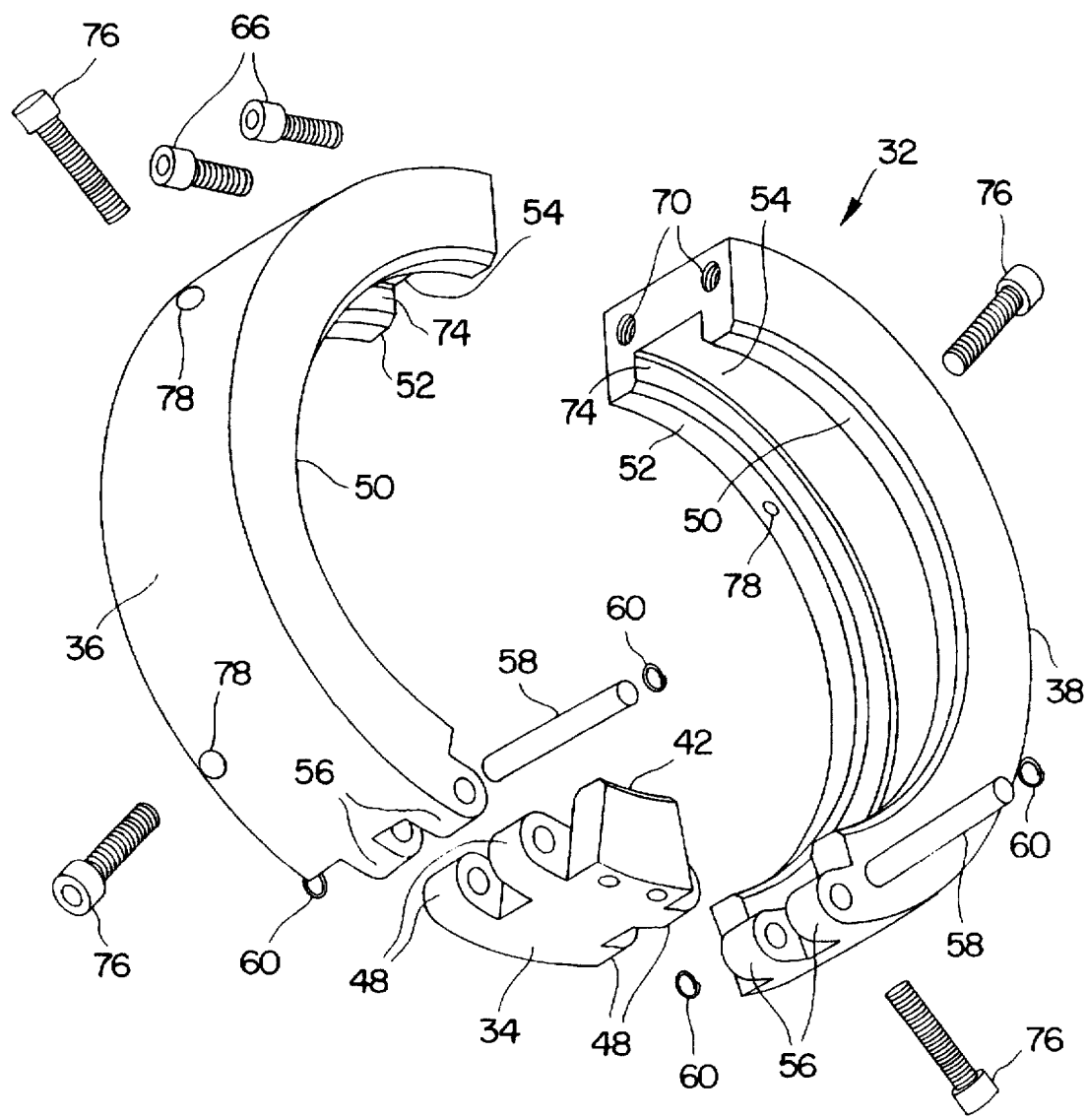
FIG. 5 is an exploded view illustrating the clamp assembly.

Die ring clamp assembly 32, shown best in FIG. 5, is mounted on the lower end of head body 12 as shown in FIG. 4. The clamp assembly 32 includes a hinge support member 34 mounted on one side of the lower end of head body 12 and a pair of arcuate clamp arms 36 and 38 which are hinged to the support member and surround the lower end of the head body to hold the die ring in place against the lower surface of ring 22. Support member 34 is mounted on one side of body 12 and includes an inwardly directed locating finger 42 which extends into circumferential groove 44 extending around the lower end of head body 12. A pair of bolts 46 extend through bores in finger 42 and secure the support member in place as illustrated in FIG. 4. The support member 34 extends downwardly beyond the lower end of head body 12 and is provided with a pair of spaced hinge projections 48 on either side of the body. Bores extend through the projections.

Figure 2:
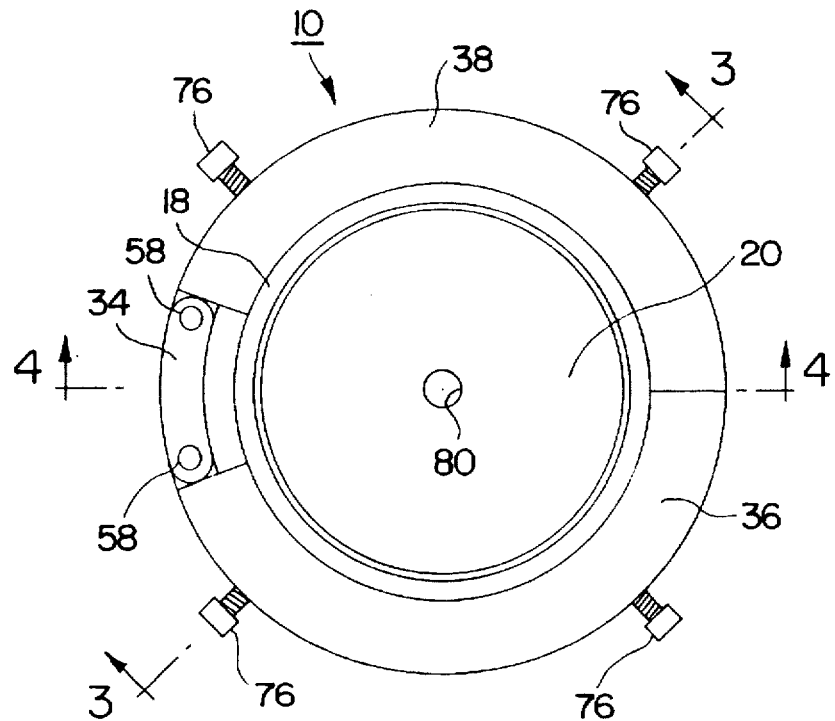
FIG. 2 is a bottom view of the extrusion head with the clamp assembly closed and the die pin and die ring in place.

Each arcuate clamp arm 36, 38 includes an inwardly facing upper arcuate ridge 50 and inwardly facing lower arcuate ridge 52. The ridges 50 and 52 define an arcuate central recesses 54. The ends of the clamp arms adjacent hinge support member 34 are provided with bored hinge projections 56 which inter-fit with projections 48 on body 34. Hinge pins 58 are fitted in bores extending through the two sets of inter-fitted projections 48, 56 to form hinge connections between the support member and the clamp arms. Pins 58 are held in place by spring rings 60 fitted in grooves formed in the outwardly projecting ends of the pins. The hinge connections permit arms 36 and 38 to be rotated between an open position shown in FIG. 1 and a closed position shown in FIG. 2. When the arms are open, die ring 18 may be moved freely along the longitudinal axis 62 of the head into position against floating insert ring 22. When the clamp arms are closed, the upper interior ridges 50 extend into groove 44 and the lower interior ridges 52 are closed under circumferential flange 64 of the die ring 18. Flange 64 extends outwardly from the top of die ring 18 to support the die ring in place on the end of body 12. The clamp arms are held closed with the free ends of the arms away from support member 34 abutting each other by a pair of bolts 66. The bolts 66 extend through bores formed in the end of arm 36 and engage threaded bores 70 in the free end of arm 38.

The clamp assembly 32 holds die ring 18 in place on the end of the head as shown in FIGS. 3 and 4 with the flat top surface 26 of the die ring flush engaging the flat bottom surface of floating insert ring 22 and the flat lower surface 72 of the die ring circumferential flange 64 engaging the flat upper surface 74 of the lower arc ridges 52. All of these surfaces lie in planes perpendicular to the longitudinal head axis 62 shown in FIGS. 3 and 4 to permit limited radial or lateral adjustment of the die ring 18 in directions perpendicular to axis 62. Lateral adjustment of the die ring adjusts the thickness of the extruded parison.

The position of the die ring on the bottom of the die head is laterally adjusted relative to the head body 12 by the use of four adjustment bolts 76 located in threaded radial bores 78 and spaced 90° around the bottom of assembly 32 in clamp arms 36 and 38. Bores 78 extend through lower ridges 52. As illustrated in FIG. 3, the inner ends of ridges 52 are spaced a distance from ring 18 permitting limited lateral shifting of the ring after arms 36 and 38 are closed by bolts 66. The opposed pairs of bolts 76 are alternately tightened and loosened to move the die ring toward and away from head axis 62 and assure that the parison has a desired circumferential wall thickness. The top of the die ring slides freely along the bottom of floating ring 18 during lateral adjustment without movement along axis 68.

Die pin 20 is easily and quickly removed from the extrusion end of head body 12 by inserting a tool in central opening 80 and then rotating the pin out of engagement with the threaded end 82 of programming rod 14.

After the die pin has been removed, bolts 66 are removed to free the ends of arms 36 and 38 to permit opening rotation of the arms to the position shown in FIG. 1 so that ridges 50 and 52 are rotated out of engagement with groove 44 and flange 64, respectively, thereby freeing the die ring from body 12. During opening of the clamp arms, the ring is supported and then lowered away from the head.

After removal of the old die ring, a new die ring is raised up into engagement with floating insert ring 22 and the clamp arms 36 and 38 are closed to secure the new ring in place on the bottom of the head. The floating insert ring 22 rests flush on the flat upper surface 26 of the new ring. Bolts 66 are extended through bores in the free end of arm 36 to engage threaded bores 70 and hold the clamp arms closed to hold the new die ring in place on the bottom of the head. A new die pin 20 is then threaded on end 82 of the programing rod and bolts 76 are adjusted to laterally shift the new ring relative to the pin to adjust the thickness of the extruded parison.

While I have illustrated and described a preferred embodiment of my invention, it is understood that this is capable of modification, and I, therefore, do not wish to be limited to the precise details set forth, but desire to avail myself of such changes and alterations as fall within the purview of the following claims.

What I claim as my invention is:

1. A parison extrusion head comprising a cylindrical body, a rod located on a longitudinal axis within the body to define an annular flow path between the rod and body, a die ring surrounding the rod, an arm support member on one side of the body, a pair of arcuate clamp arms each having opposed ends, a pair of hinges each joining one end of one clamp arm to the body, said clamp arms surrounding the body and the die ring, a radially inwardly extending first ridge on each clamp arm, each said ridge having an upper support lying in a plane perpendicular to said axis and facing the head, said die ring including a circumferential flange having a lower surface lying in said plane, facing away from the body and engaging said upper supports, and adjustment structure on said arms engaging said ring operable to move the ring laterally relative to said axis while maintaining engagement between such surface and supports.

2. A parison extrusion head as in claim 1 wherein said arms overlie said ring and said body.

3. A parison extrusion head as in claim 2 including a circumferential groove in the head, and wherein each arm includes a radially inwardly extending second ridge, said second ridges fitted in said groove.

4. A parison extrusion head as in claim 3 including a hinge support member on the body extending beyond said end of the body, said hinges joining said member and said arms.

5. A parison extrusion head as in claim 4 wherein said adjustment structure comprises a plurality of bolts extending through said arms and engaging said die ring.

6. A parison extrusion head as in claim 5 including a disengageable connection joining the other ends of the arms.

7. A parison extrusion head as in claim 4 wherein said member includes a finger in said circumferential groove.

8. A parison extrusion head as in claim 2 including a floating ring between the head and die ring.

9. A parison extrusion head as in claim 2 wherein said upper supports comprise planar surfaces.

10. A parison extrusion head as in claim 1 including a die pin on the end of the rod located inside the die ring.

11. A parison extrusion head comprising a cylindrical body having a discharge end, a rod located on a longitudinal axis within the body to define an annular flow path between the rod and body, a die ring surrounding the rod and overlying the end of the body, a pair of arcuate clamp arms surrounding the end of the body and the die ring, a connection mounting each clamp arm on the body and permitting movement of the clamp ring away from the body, each clamp arm including a radially inwardly extending ridge having an upper support surface lying in a plane perpendicular to said axis and facing the head, said die ring including a circumferential flange having a lower surface lying in said plane and facing away from the body, said flange being spaced inwardly from said clamp arms, said surfaces engaging each other, and adjustment bolts extending through said clamp arms and engaging said die ring.

12. A parison extrusion head as in claim 11 including a floating insert ring confined between the end of the body and said die ring.

13. A parison extrusion head as in claim 11 wherein said connections comprise hinges and are located adjacent each other, and including an end connection joining together the other ends of the clamp arms away from the hinge connections.

14. A parison extrusion head as in claim 11 including a die pin on the rod.

* * * * *